(12) United States Patent
Friedman et al.

(10) Patent No.: US 7,269,160 B1
(45) Date of Patent: Sep. 11, 2007

(54) VOICE OVER INTERNET CALL CENTER INTEGRATION

(75) Inventors: David Friedman, Valhalla, NY (US); Wai Wu, Valhalla, NY (US)

(73) Assignee: Buffalo International, Inc., Valhalla, NY (US)

( * ) Notice: Subject to any disclaimer, the term of this patent is extended or adjusted under 35 U.S.C. 154(b) by 0 days.

(21) Appl. No.: 09/579,370

(22) Filed: May 26, 2000

(51) Int. Cl.
H04L 12/66 (2006.01)

(52) U.S. Cl. ............... 370/352; 370/359.52; 370/493; 370/900; 705/26; 709/203

(58) Field of Classification Search ............... 370/259, 370/352, 395.52, 493, 494, 495; 379/900; 705/17, 39, 40; 709/203, 328, 329
See application file for complete search history.

(56) References Cited

U.S. PATENT DOCUMENTS

| | | | |
|---|---|---|---|
| 4,696,028 A | 9/1987 | Morganstein et al. ......... | 379/88 |
| 4,797,911 A | 1/1989 | Szlam et al. .................. | 379/67 |
| 4,894,857 A | 1/1990 | Szlam et al. .................. | 379/67 |
| 5,070,525 A | 12/1991 | Szlam et al. ................. | 379/196 |
| 5,214,688 A | 5/1993 | Szlam et al. .................. | 379/67 |
| 5,241,625 A | 8/1993 | Epard et al. ................. | 395/163 |
| 5,309,505 A | 5/1994 | Szlam et al. .................. | 379/88 |
| 5,384,771 A | 1/1995 | Isidoro et al. ............. | 370/58.2 |
| 5,473,680 A | 12/1995 | Porter ......................... | 379/201 |
| 5,500,859 A | 3/1996 | Sharma et al. ................ | 370/81 |
| 5,511,112 A | 4/1996 | Szlam .......................... | 379/88 |
| 5,526,353 A | 6/1996 | Henley et al. ............. | 370/60.1 |
| 5,533,115 A | 7/1996 | Hollenbach et al. ........ | 379/220 |
| 5,546,324 A | 8/1996 | Palmer et al. .............. | 364/514 |
| 5,546,452 A | 8/1996 | Andrews et al. ............ | 379/219 |
| 5,581,602 A | 12/1996 | Szlam et al. .................. | 379/67 |
| 5,594,791 A | 1/1997 | Szlam et al. ................ | 379/265 |
| 5,666,416 A | 9/1997 | Micali ......................... | 380/23 |
| 5,675,637 A | 10/1997 | Szlam et al. ................ | 379/142 |
| 5,677,955 A | 10/1997 | Doggett et al. ............... | 380/24 |
| 5,717,757 A | 2/1998 | Micali ......................... | 380/25 |
| 5,793,868 A | 8/1998 | Micali ......................... | 380/28 |
| 5,815,657 A | 9/1998 | Williams .................... | 395/186 |
| 5,828,731 A | 10/1998 | Szlam et al. .................. | 379/88 |
| 5,839,119 A | 11/1998 | Krsul et al. .................... | 705/39 |
| 5,857,023 A | 1/1999 | Demers et al. ............... | 380/24 |

(Continued)

OTHER PUBLICATIONS

Rivest et al "Payword and Micromint:Two Simple Micropayment Schemes" May 7, 1996.

(Continued)

*Primary Examiner*—Chi Pham
*Assistant Examiner*—Shick Hom
(74) *Attorney, Agent, or Firm*—Mille & Hoffberg LLP

(57) ABSTRACT

A telephony server, comprising an application program executing under an operating system, communicating directly with telephony hardware to implement telephony system control, having an application programming interface including a call to an external program also executing under the operating system, the application program supporting a plurality of instances of the external programs simultaneously, each external program implementing call handling logic for at least one voice communications channel. The application program may communicate with a Web server, wherein said server proactively communicates with the user in dependence on an automated analysis of a status of a user's shopping cart, representing items of interest having an unconcluded transaction status, requesting establishment of an interactive voice communication session.

28 Claims, 2 Drawing Sheets

U.S. PATENT DOCUMENTS

| | | |
|---|---|---|
| 5,884,277 A | 3/1999 | Khosla .................. 705/14 |
| 5,903,651 A | 5/1999 | Kocher .................. 380/25 |
| 5,903,880 A | 5/1999 | Biffar .................. 705/39 |
| 5,915,093 A | 6/1999 | Berlin et al. ............ 395/200 |
| 5,930,777 A | 7/1999 | Barber .................. 705/40 |
| 5,933,498 A | 8/1999 | Schneck et al. ............ 380/4 |
| 5,937,394 A | 8/1999 | Wong et al. .............. 705/26 |
| 5,960,083 A | 9/1999 | Micali .................. 380/23 |
| 5,963,924 A | 10/1999 | Williams et al. .......... 705/40 |
| 5,987,132 A | 11/1999 | Rowney .................. 380/24 |
| 5,996,076 A | 11/1999 | Rowney et al. ........... 713/201 |
| 6,016,484 A | 1/2000 | Williams et al. .......... 705/39 |
| 6,018,724 A | 1/2000 | Arent .................... 705/14 |
| 6,021,202 A | 2/2000 | Anderson et al. .......... 380/25 |
| 6,035,402 A | 3/2000 | Vaeth et al. ............. 713/201 |
| 6,046,762 A | 4/2000 | Sonesh et al. ............ 348/16 |
| 6,049,786 A | 4/2000 | Smorodinsky ............. 705/40 |
| 6,049,787 A | 4/2000 | Takahashi et al. ......... 705/44 |
| 6,058,381 A | 5/2000 | Nelson .................. 705/40 |
| 6,061,448 A | 5/2000 | Smith et al. ............. 380/21 |
| 6,061,665 A | 5/2000 | Bahreman ................ 705/40 |
| 6,064,667 A | 5/2000 | Gisby et al. ............. 370/352 |
| 6,337,858 B1 * | 1/2002 | Petty et al. .............. 370/356 |
| 6,721,713 B1 * | 4/2004 | Guheen et al. ............. 705/1 |
| 6,771,766 B1 * | 8/2004 | Shafiee et al. .......... 379/265.09 |
| 6,772,139 B1 * | 8/2004 | Smith, III ................ 707/3 |
| 6,941,273 B1 * | 9/2005 | Loghmani et al. .......... 705/26 |
| 2002/0046030 A1 | 4/2002 | Haritsa et al. ............ 704/256 |
| 2002/0046200 A1 | 4/2002 | Floven et al. ............. 706/61 |
| 2002/0046202 A1 | 4/2002 | Honda .................... 707/1 |

OTHER PUBLICATIONS

Micropayment Transfer Protocol Version 0.1 (Nov. 22, 1995) http://www.w3.org/pub/www/tr/wd-mptp.

Common Markup for Web Micropayment Systems, http://www.w3.org/tr/wd-micropayment-markup (Sep. 6, 1999).

Distributing Intellectual Property . . . , Olivia Maurizio, http://olivia.modlang.denison.edu/~olivia/RFC/oa/.

Common Markup for Micropayment Per-Fee-Links; http://www.w3.org/tr/wd-micropayment-markup/ W3C Working Draft Aug. 25, 1999.

* cited by examiner

VOICE OVER INTERNET CALL CENTER INTEGRATION

FIELD OF THE INVENTION

The present invention relates to the field of voice over Internet Protocol (VOIP) communications systems, and more particular to new and useful functions implemented using the VOIP associated ability to reach large audiences.

BACKGROUND OF THE INVENTION

Much information on the nature of traditional computer telephony hardware and software is available in a number of publications accessible to the present inventors and to those with skill in the art in general. One document which provides considerable information on intelligent networks is "ITU-T Recommendation Q.1219, Intelligent Network User's Guide for Capability Set 1", dated April, 1994. This document is incorporated herein by reference.

In a call center, a relatively large number of agents typically handle telephone communication with callers. Each agent is typically assigned to a telephone connected to a central switch, which is in turn connected to a public-switched telephone network (PSTN), well-known in the art. The central switch may be one of several types, such as Automatic Call Distributor (ACD), Private Branch Exchange (PBX), or PSTN. Each agent also typically has access to a computer platform having a video display unit (PC/VDU) which may be adapted, with suitable connectivity hardware, to process Internet protocol telephony calls.

Intelligent telephony networks and IP networks typically share infrastructure to some extent, and computer equipment added to telephony systems for computer-telephony integration (CTI) are also capable of Internet connection and interaction. There is therefore often no clear distinction as to what part of a network is conventional telephony, and what part is IPT. In conventional telephony systems, such as publicly-switched telephony networks (PSTNs), there are computerized service control points (SCPs) that provide central routing intelligence (hence intelligent network). IPNs do not have a central router intelligence, such as a SCP. IPNs, however, have multiple Domain Name Servers (DNS), whose purpose is basically the same as the routers in intelligent networks, which is controlling the routing of traffic. Instead of telephony switches (PBXs), IP switches or IP routers are used. An organization having one or more call centers for serving customers typically provides one or more telephone numbers to the public or to their customer base, or both, that may be used to reach the service. In the case of an IP network, a similar organization may provide an IP address for client access to services, and there are a number of ways the IP address may be provided. Such numbers or addresses may be published on product packaging, in advertisements, in user manuals, in computerized help files, and the like.

Routing of calls in intelligent networks, then, may be on several levels. Pre-routing may be done at SCPs and further routing may be accomplished at individual call centers. As described above a call center in an intelligent telephony system typically involves a central switch The central switch is typically connected to a publicly-switched telephone network (PSTN), well-known in the art. Agents, trained (hopefully) to handle customer service, man telephones connected to the central switch. This arrangement is known in the art as Customer Premises Equipment (CPE). If the call center consists of just a central switch and connected telephone stations, the routing that can be done is very limited.

Switches, although increasingly computerized, are limited in the range of computer processes that may be performed. For this reason additional computer capability in the art has been added for such central switches by connecting computer processors adapted to run control routines and to access databases. The processes of incorporating computer enhancement to telephone switches is known in the art as Computer Telephony Integration (CTI), and the hardware used is referred to as CTI equipment.

In a CTI system telephone stations connected to the central switch may be equipped also with computer terminals, as described above, so agents manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center. It is this processor that provides the CTI enhancement for the call center. Agents having access to a PC/VDU connected on a LAN to a CTI processor in turn connected to a telephony switch, may also have multi-media capability, including Internet connectivity, if the CTI processor or another server connected to the LAN provides control for Internet connectivity for stations on the LAN.

When a telephone call arrives at a call center, whether or not the call has been pre-processed at a SCP, typically at least the telephone number of the calling line is made available to the receiving switch at the call center by a telephone carrier. This service is available by most PSTNs as caller-ID information in one of several formats. If the call center is computer-enhanced (CTI) the phone number of the calling party may be used to access additional information from a database at a server on the network that connects the agent workstations. In this manner information pertinent to a call may be provided to an agent.

Referring now to the example proposed of a technical-service organization, a system of the sort described herein will handle a large volume of calls from people seeking technical information on installation of certain computer-oriented equipment, and the calls are handled by a finite number of trained agents, which may be distributed over a decentralized matrix of call centers, or at a single call center. In examples used herein illustrating various aspects of the present invention, the case of a decentralized system of multiple call centers will most often be used, although, in various embodiments the invention will also be applicable to individual call centers.

Even with present levels of CTI there are still problems in operating such call centers, or a system of such call centers. There are waiting queues with which to contend, for example, and long waits may be experienced by some callers, while other agents may be available who could handle callers stuck in queues. Other difficulties accrue, for example, when there are hardware or software degradations or failures or overloads in one or more parts of a system. Still other problems accrue due to known latency in conventional equipment. There are many other problems, and it is well recognized in the art, and by the general public who have accessed such call centers, that there is much room for improvement in the entire concept and operation of such call center systems. It is to these problems, pertaining to efficient, effective, timely, and cost-effective service to customers (users) of call center systems that aspects and embodiments of the present invention detailed below are directed.

See, U.S. Pat. No. 6,064,667 (Gisby, et al., May 16, 2000), expressly incorporated herein by reference.

Business applications for call centers are virtually unlimited in the types of transactions that they can accommodate. Call centers can support, for example, sales, including order entry, order inquiry, and reservations; financial services, including funds transfer, credit card verification, and stock transactions; information services, including event schedules, referral services, transportation schedules, and yellow pages; customer services, including technical support, repair dispatch, and claims handling.

Despite the almost innumerable applications, however, existing ACD centers have several limitations. One notable drawback to ACDs is that they lack intelligence. In other words, limited inflexible intelligence is built into the ACD software. Routing of inbound and outbound calls is based on circuit switching. Furthermore, existing ACD centers cannot be accessed through a plurality of access means, such as voice, data, and video. To maximize existing resources and to take advantage of the latest technology, ACD manufacturers are trying to open their systems to third-party inbound and outbound call management systems by integrating, via the recently introduced Computer Telephony Integration ("CTI") standards, the Telephony Application Programming Interface ("TAPI"), the Telephony Services Application Programming Interface ("TSAPI"), and other proprietary protocols. These third-party inbound and outbound call management systems apply computer control and functionality to telephones. Adding computer intelligence to unintelligent telephone devices provides users with more information about inbound calls and lets them use telephones more effectively to distribute information by providing not only customer records coincident with inbound and outbound phone calls, but also skill-based call routing matching agent skills with caller needs and virtual, or geographically distributed, call centers.

One trend in the ACD industry is to enable call agents to be more efficient, productive and to ultimately provide the best service to the customer during the first contact. Technologies such as Automatic Number Identification ("ANI") where the caller phone number is passed to the agent, give agents the opportunity to access information about the caller from corporate databases. The latest CTI technologies play a major role in helping companies respond to industry trends and experience increased productivity and customer service goals by integrating traditional ACDs with computers.

In parallel to the development of ACDS, there are Internet Customer Service Centers ("ICSCs") under development. These applications provide for access to a World Wide Web (WWW) site, where information pertaining to customer service, such as order status or tips for problem resolution, can be easily obtained. The user of the ICSC uses a WWW browser to search for the requested information. The user may obtain information in the form of text, voice or video. Further, the user may download information to computer data files. Live transfer to a customer service representative is not possible. Examples of patents covering various aspects of communication via data and telecommunication networks are described below.

U.S. Pat. No. 5,533,115 to Hollenbach et al. discloses an advanced ACD for providing information to callers through the Public Switch Telephone Network ("PSTN"). An incoming call from a customer passes through the PSTN to an intelligent peripheral, a service control point, and an ACD. In many cases, the caller is prompted in queue to provide some information, such as the caller's phone number or account number. This information is used to access data records stored in a database which are presented to an agent at an agent terminal. The agent station has access to external communication services, one of which is the Internet. Similarly, U.S. Pat. No. 5,546,452 to Andrews et al. discloses an ACD controlled by a distributed central controller. However, neither Hollenbach et al. nor Andrews et al. appear to disclose an ACD with the capacity to service multimedia callers; only the agent stations have access to the Internet or wide-area networks. Unfortunately, therefore, neither Hollenbach et al. nor Andrews et al. solve the problem of allowing access to a multimedia ACD via data networks. Furthermore, neither Hollenbach et al. nor Andrews et al. teach or disclose the use of an MMACD Server as connection manager for data network callers.

U.S. Pat. No. 5,500,859 to Sharma et al. discloses a personal communications system operating on a personal computer which allows the user to select between different communications functions, including telephone call, voice mail, fax transmissions, and multimedia mail. Sharma et al., however, does not solve the problems of providing a multimedia telecommunication ACD system which allows access to the call center via a plurality of access means and providing an MMACD server to act as connection manager for callers.

U.S. Pat. No. 5,384,771 to Isidoro et al. discloses a multimedia call configuration system. Isidoro et al. uses an object oriented command set to establish a multimedia call over a broadband network. One command set relates to the call configuration and another—to the connection configuration. Unfortunately, however, Isidoro et al. does not solve the problem of providing a multimedia telecommunication ACD system which allows access to the call center via a plurality of access means; rather, it is directed toward establishing communications between multiple specific parties and has no automatic call direction (ACD) capability at all.

U.S. Pat. No. 5,546,324 to Palmer et al. discloses a video conferencing system used over a data network to communicate among terminals of the network. However, Palmer et al. is only directed to transferring video and audio data. Unfortunately, Palmer et al. does not solve the problems of providing a multimedia telecommunication ACD system which allows access to the call center via a plurality of access means and providing a MMACD server to act as connection manager for callers. Rather, it is directed toward establishing communications between multiple specific parties and has no automatic call direction (ACD) capability at all.

U.S. Pat. No. 5,526,353 to Henley et al. discloses a system and method for communication of audio data over a packet-based network. Henley et al., however, does not solve the problems of providing a multimedia telecommunication ACD system which allows access to the call center via a plurality of access means and providing a MMACD server to act as connection manager for data network callers.

U.S. Pat. No. 5,241,625 to Epard et al. discloses a system for sharing screens over a heterogeneous network. Similarly, U.S. Pat. No. 5,473,680 to Porter discloses methods and apparatus for interfacing with application programs to manage multimedia multiparty communications using different hardware systems and devices. Neither Epard et al. nor Porter solve the problem of providing a multimedia telecommunication ACD system which allows access to the call center via a plurality of access means or a MMACD server acting as a connection manager for callers. Rather, they are directed toward establishing communications between multiple specific parties and have no automatic call direction (ACD) capability at all.

See, U.S. Pat. No. 6,046,762 (Sonesh, et al., Apr. 4, 2000), expressly incorporated herein by reference.

SUMMARY OF THE INVENTION

The present invention provides an open application programming interface (API) telephony server (OTS™), and a set of new functions particularly enabled thereby.

The API of the OTS™ is provided in the Appendix. Of particular note is that the OTS™ application is present as a dynamic link library (DLL) executing-on a Microsoft Windows NT operating system server, and the OTS™ DLL includes functionality to call and pass parameters with multiple instances of multiple other DLLs. Thus, the functionality of the OTS™ is not fixed nor limited to predefined functionality. Further, certain platform dependent code may be segregated, thereby enhancing the hardware independence of the core OTS™ DLL. The particular command is the "RunExtension" command, (and the related "ExtCmpMsg" and "OTSExtensionEntry" commands).

The OTS™ has a corresponding client system resident DLL, which may also have the ability to call external DLLs on the client system.

The present invention also provides enhanced functionality for VOIP systems.

These functions include proactive communications between a telephony server and client systems over the Internet; one click connection to a call center from a Web browser, based on a prestored user profile defining a method of communication and parameters therefore; credit card support for use of VOIP telephony; and an application service provider model for computer telephony (differing from Centrex), eliminating the need for costly dedicated customer premises equipment, while allowing efficient short term usage of adequately configured systems.

It is an object of the invention to provide a system of open telephony that features proactive telephone dialing of the user of a server computer by a representative of the service that is initiated by some action or response of the user to items on the server.

It is another object of the invention to provide a system of proactive dialing that allows the user himself to initiate the dialing by using a one-click function of the system.

It is another object of the invention to provide a system that integrates debit or credit card use with the proactive dialing, allowing efficient payments for telephony usage. Alternately, billing may be by way if an ISP, local telephone carrier, micropayments, prepayment, or the like.

These objects and other objects that will become apparent from the following specification are fulfilled by a telephony system that comprises a server coupled to telephone service and having a program that provides telephone dialing of the user of the server by a representative of the service. Thus, a user of a Web site may be proactively contacted by a call center. This contact may be randomly generated, but preferably, it is initiated based on a pattern and/or status of use of a Web site by the user. This system may also be used to provide voice mail or to contact the user for customer service, although other means are available in that case.

Thus, a call may be placed to a user based on an apparent need for assistance, an indication that a personalized salesperson call would be effective in closing a transaction, or for various other reasons.

In operation, the client system stores a cookie or other persistent state identifier, which allows the user to select contact preferences. For example, the preference may be for a VOIP connection to the same IP address as the Web browser, to a different IP address or telephone number, to a dial-up line (then presently in use by the browser, in which case the call center would wait to call until the line is clear), or the like. The call center may be able to cooperate with an Internet Service Provider to capture the automatic number identification (ANI) of a telephone line, even if the user does not know the number, or is mobile.

The cookie may be placed on the client machine during an initial registration, and persist thereafter. If the cookie is lost, it may be recreated or retrieved from a server based on a username/password.

Thus, only a single pointing device action is necessary to initiate the outbound call process from the call center. It is noted that this process need not involve a call center, and would be operable even between, for example "Chat" partners. By providing a set of preferences to account for various hardware limitations and implement required control sequences, the incompatibilities between the various user hardware are minimized, and the process made "user friendly".

In some cases, the user is required to pay for calls. In that case, the telephony system preferably integrates debit or credit card verification and charging, for example used with the proactive dialing. A micropayment accounting mechanism may be part of the system.

Micropayments are often preferred where the amount of the transaction does not justify the costs of complete financial security. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of a non-real time transactions of small monetary units are substantially less than those of secure, unlimited or potentially high value, real time verified transactions, allowing and facilitating such types of commerce. Thus, the rights management system may employ applets local to the client system, which communicate with other applets and/or the server and/or a vendor/rights-holder to validate a transaction, at low transactional costs.

The following U.S. patents, expressly incorporated herein by reference, define aspects of micropayment, digital certificate, and on-line payment systems: U.S. Pat. No. 5,930,777 (Barber); U.S. Pat. No. 5,857,023 (Demers et al.); U.S. Pat. No. 5,815,657 (Williams); U.S. Pat. No. 5,793,868 (Micali); U.S. Pat. No. 5,717,757 (Micali); U.S. Pat. No. 5,666,416 (Micali); U.S. Pat. No. 5,677,955 (Doggett et al.); U.S. Pat. No. 5,839,119 (Krsul; et al.); U.S. Pat. No. 5,915,093 (Berlin et al.); U.S. Pat. No. 5,937,394 (Wong, et al.); U.S. Pat. No. 5,933,498 (Schneck et al.); U.S. Pat. No. 5,903,880 (Biffar); U.S. Pat. No. 5,903,651 (Kocher); U.S. Pat. No. 5,884,277 (Khosla); U.S. Pat. No. 5,960,083 (Micali); U.S. Pat. No. 5,963,924 (Williams et al.); U.S. Pat. No. 5,996,076 (Rowney et al.); U.S. Pat. No. 6,016,484 (Williams et al.); U.S. Pat. No. 6,018,724 (Arent); U.S. Pat. No. 6,021,202 (Anderson et al.); U.S. Pat. No. 6,035,402 (Vaeth et al.); U.S. Pat. No. 6,049,786 (Smorodinsky); U.S. Pat. No. 6,049,787 (Takahashi, et al.); U.S. Pat. No. 6,058,381 (Nelson); U.S. Pat. No. 6,061,448 (Smith, et al.); U.S. Pat. No. 5,987,132 (Rowney); and U.S. Pat. No. 6,061,665 (Bahreman). See also, Rivest and Shamir, "PayWord and Micro-Mint: Two Simple Micropayment Schemes" (May 7, 1996), expressly incorporated herein by reference; Micro PAYMENT transfer Protocol (MPTP) Version 0.1 (22 Nov. 1995) et seq,; Common Markup for web Micropayment Systems, (9 Jun. 1999); "Distributing Intellectual Property: a Model of Microtransaction Based Upon Metadata and Digital Signatures", Olivia, Maurizio.

BRIEF DESCRIPTION OF THE DRAWING DRAWINGS

DETAILED DESCRIPTION OF THE PREFERRED EMBODIMENTS

There are thus four major aspects of the system:

1. The first is the object telephony server (OTS™), a computer program with an application programming interface (hereinafter referred to as ("API"). Preferably, this OTS™ is extensible by the ability to call external DLLs, and further can handle multiple simultaneous tasks by spawning multiple instances of required DLLs. Therefore, a single instance of the OTS™ can handle hundreds of voice channels simultaneously, since the load on the OTS™ is minimal, either due to the intrinsic simplicity of the functions handled, or the externalization of complex or time-consuming tasks.

2. The second is proactive dialing, employing Internet cookies to track users and maintain communications preferences. The server thus understands which users are actively using a site, what their status within the site is, and can make some sort of an intelligent or automated intelligence decision as to who should be contacted for voice communications.

Figure 1:
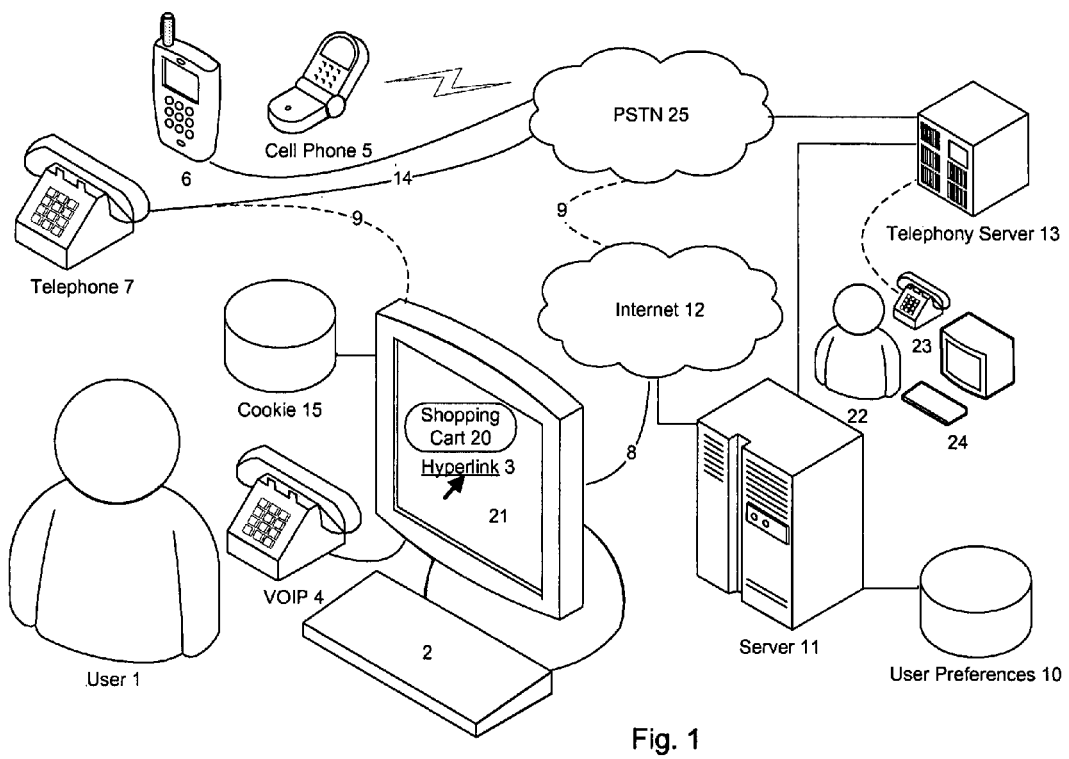
FIG. 1 shows a system architecture according to the present invention.
Figure 2:
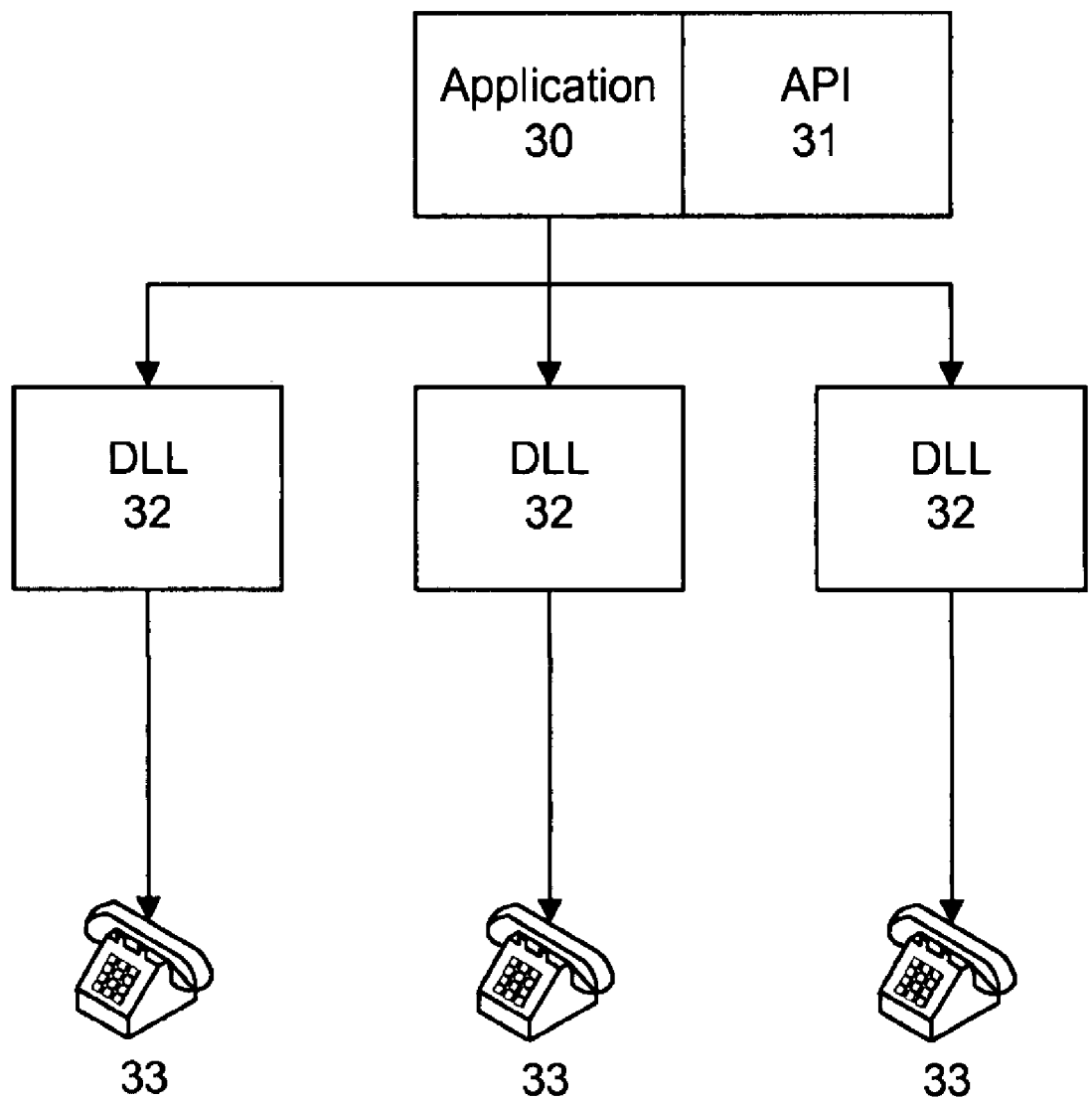
FIG. 2 shows a schematic diagram of a system architecture according to the present invention.

3. The third is a one-click (user initiated) telecommunications function and its ability to invoke a set of user preferences 10 (as shown in FIG. 1), which are present either in a cookie or referenced on the server 11 via cookie. It initiates telecommunications, through a selected communications channel (or set of channels or priority protocol). Thus, the functionality on the Web page of the Web site is transparent to the call type, which is handled through the OTS™ executing on a telephony server 13, rather than the Web server 11. Where appropriate, debit or credit card charges may be imposed automatically, or after an authorization.

4. The fourth one is application service provider (hereinafter referred to as ("ASP") model. The architecture of the system of the invention and the functionality of the system potentially allow the creation of a new market for an application service provider for telephony servers. In a fast moving market, people do not want to invest long-term in telephony equipment or telephony servers. The invention provides for capitalizing on the rapid state of change by renting the telephone server software, hosted either externally, while providing minimum on-premises hardware. This model may also be used to implement a "try-it-before-you-buy-it" plan, or an out sourcing plan. In other words, since Internet bandwidth is relatively cheap, a VOIP system running on a computer network with appropriate audio interfaces would require minimal dedicated hardware, and the telephony server and telephone network interfaces may be hosted remotely. Typically, the customer premises equipment would include a Windows NT operating system server with an appropriate number and type of Dialogic boards, with the OTS™ server executing locally.

Part of this invention includes a new economic model for the sale and use of telephony equipment. On the telephony side, the OTS™ system it is very comprehensive in terms of all functions right in one box, with functions implemented primarily in software, especially at the client systems. An important aspect is the extensibility across multiple sites, across the network and the scaling that results from being able to put multiple systems that behave together as one, the ability to distribute the load among multiple server boxes and still have the system act as one.

The present invention also provides a telephony computer-network appliance, hereinafter called a desk-top box. This desk-top box provides a twisted pair Ethernet interface (or other standard computer network interface), a communications processor, supporting G.711 or G.723 or other standard network audio protocols, an audio interface, e.g., a handset or speakerphone, and a manual user interface, e.g., pushbuttons. Advantageously, but not necessarily, the desktop box supports the client portion of the OTS™. The desk-top box may also integrate other functions, such as telephone answering device and voicemaill/autoattendant, e-mail and Web browsing, and the like.

The OTS™ is a scaleable architecture, and in large installations, is a distributed architecture, which does not require large amounts of computing power to operate. This is a result of two factors. The first is that this is a Windows NT operating system based system, such as the OTS™, can communicate across a network, and second, much of the telephone call progress processing is done by Dialogic boards, which are hardware level support for telephony applications. The server merely has to control the system, not implement the functions. The software makes it behave in a certain way.

The system provides an API that translates the minutia of hardware level and register level programming of hardware telephony cards, such as the aforementioned Dialogic cards, into a application program level interface so that different versions of the server can operate with different hardware. If a user desires to upgrade his hardware to either a different Dialogic board, even if a change is made in the low level interface, or migrate to some other vendor, that is possible. Thus, while the OTS™ may require certain modifications, the application software will be portable to the new platform.

At high level, the user doesn't have to program in low level functions. Therefore, the user program need only deal with high level functionality in user interface.

Programming of the high level functions can be almost at a scripting level, as opposed to a coding level, although the application programs for the OTS™ are not scripts; some code writing is still required, but it is high level code. In fact, it is possible to provide a secondary product, which supports a scripting function for the OTST™.

The OTS™ DLL has extensibility, or the ability to call from the server a DLL which does not have to be defined at the time the server is coded and finalized. It allows developers to use any language that they want, to script out the logical flow of their calls and the necessary database and business rules and encapsulate it into that DLL which is called by the OTS™ application of the invention, and which can be invoked by the application through a stimulus from a third party application. Thus, these called DLLs may be provided by third parties.

The OTS™ API 31 is a real time asynchronous API, that supports up to over 400 ports, meaning that it can control a large number of phone 33 calls, e.g., a system with 100 lines. A client application 30 may be developed which is controlling the server, and communicates through the basic API 31. However, in this case, it is necessary to develop a multi-threaded application that can moderate the real time asynchronous communication needs of all of those 100 telephone calls simultaneously, which this complex. Through the preferred DLL 32 mechanism according to the present invention, it is possible to implement the logic required to handle one individual phone 33 call in the form of a DLL 32, using any programming language desired.

For example, the routing of the call may be as follows: the call comes in, some data is received from the telephone network, that data is matched against an external database, conditions in the call center are analyzed, and then, based on this analysis, the routing of the call is determined and the telephony hardware is given an instruction to route a call to a particular destination or play a certain message to the caller. That call processing must be multi-thread into the control application, among other call handling needs, which is difficult to do through a conventional API. If this is implemented in a DLL 32, the primary call control application can simply, when a call comes in, pass it to the DLL 32, and the DLL 32 is independently invoked simultaneously on as many phone 33 calls that need that DLL 32 at that moment in time. So, if 100 calls come in requiring the same logic, as each phone 33 call comes in, a new instance of the DLL 32 is invoked, and it runs independently from the other instances. What this does is to take advantage of some of the internal capabilities of Windows NT operating system, and eliminate the need to actually code the multi-threading and the management of the multiple calls in the program logic itself. The program only need to call that DLL 33 at an appropriate point in time.

Such a called DLL can communicate directly to the hardware layer under NT, but need not in accordance with the present invention. However, if it was required to support a custom piece of hardware, it would be possible, at the DLL level, if properly installed under NT, to communicate with the hardware, thus providing an open architecture and intrinsic extensibility.

Instead of somebody having to buy the software and implement the system based on a three or five year amortization, they can lease the software on a monthly or yearly basis, and since telephony is to some degree hardware based, they will have to implement an NT box with dialogic cards. That cannot be outsourced unless one has a Centrex type system.

According to the present invention, the OTS™ server resides in the same server as the telephone hardware, since this server interfaces with the boards. It is possible to split the high and low level functions into different files, but since the OTS™ is a relatively small program, this is generally unnecessary. Thus, on a high level, the system software can be distributed across multiple boxes, in multiple locations.

Software that operates at a higher level than the API is client application software for the DLLs. The DLLs can be run on the same NT box as the software that invokes them, but the OTS™ system is not limited to that configuration. It is also possible to have a slave hardware control layer running on that box, but at the API layer, separated out and running on a different server.

Two advantages are provided with an application services provider mode; the first is that the provider does not give up control over the software, which makes it easier to justify a short term implementation, and the second is that it makes it easier for the provider to suggest to a client that they can easily have distributed hardware. Because their software no longer has to be ported over multiple platforms, they can have one instance of their application software, and the provider's API to hardware abstraction layer software can implement the cross platform or the distributed architecture.

As an application service provider, new revenue models are available for use of the system. Thus, it is possible to arrange a monthly lease, pay by the minute, or pay by the call, or some combination of these. It is also possible to have payment by the number of minutes or seconds that certain types of resources in the system are used. It is noted that, while charging by the minute for the use of telecommunications services is the general revenue model of telecommunications carriers, this is not a typical model for software providers or telephone hardware providers. It is also possible to isolate out voice processing resources, conferencing resources, IP resources, switching resources, line interfaces, voice recognition, text to speech, or other similar resources, either isolating out features or isolating out physical resources and metering them on a microscale.

Another advantage of an application service provider it is also possible for the central network to actually interface with the telephone company, and to have some or all of the telecommunications hardware at the provider's site, using packet switched networks to communicate between the telecommunications carrier and the call center. It is thus possible to provide a service that requires little dedicated hardware at a client's site, with a VOIP implementation.

A user can subscribe to the provider's service and use VOIP, and that would implement all of the call center functions and the network connections. This technology therefore enables virtual call centers. The minimum bandwidth that a user would need is about 9600 baud, although 128 k (2B) (DSL or ADSL) or 144 k (2B+D) (ISDN), per operator, would be superior, depending on desired data communications bandwidth and voice quality.

The present invention provides a "One-click" business model that allows somebody, while they're browsing the web or otherwise in a data communications mode, to have a single action that triggers a sequence of events that ultimately leads to voice communication between that person and a call center, or that person and another person in the event of a one-to-one communication scheme. The different options available are a dial back or the user can initiate the call. The call center can initiate the call to the user, whether it is over IP, using the same phone line the user is using for browsing now, or a different phone line.

As shown in FIG. 1, the present invention does not require a consistent transport protocol for all users, e.g., VOIP. The invention provides that only a single click, may be used to select a hyperlink 3, to establish the preferred means of communication. e.g. one of various means 4, 5, 6, as opposed to having different clicks depending on a preferred means of communication. The idea is that if the user is on a dialup line 7 for their internet connect, and they would prefer to speak on a separate telephone, e.g., 5, 6, that is different from VOIP over the existing connection. While VOIP is probably the most trivial in broadband scenarios, it poses issues for many consumers, especially those using dial-up connections. On a dialup line 7, there is basically no bandwidth left after implementing the VOIP, which has inferior quality to analog voice over the same line.

In peer-to-peer communications, both the requester of the communication and the recipient of the communication may each have preferences. Therefore, the present invention accommodates the preferences of each party, so long as they are possible and compatible. Even with communications to a call center, the user preferences may define a Spanish language operator or optimally route the call based on a user profile.

Existing VOIP applications may give the user the same kind of functionality through use of the ANI/DNIS. If H.323 is used, the data communications components may be used to allow the two systems on either end to know something about each other.

For example, the present one-click process (generally peer-to-peer) could be implemented on a web site like e-Bay. If somebody wants to communicate with an auctioneer, he pushes an icon button, which then serves to establish an IP communication session on the requesting user's side. On the auctioneer's side, however, the call be directed to ring his cell phone. Thus, there is no a priori specification as to what the mode of communication on either end of the connection is.

It is noted that the HTML code necessary to place the functionality on a web page is small, since the hyperlink 3 only access a URL server 11, which retrieves the cookie and possibly other information about the user and his connection i.e. the user preferences 10. Thus, it can be liberally distributed to a variety of Web sites.

One of the advantages of this browser mediated conveyance of communication preferences over presentation of a phone number is that it allows a degree of anonymity, especially in VOIP to VOIP communications. The user preferences for connection or callback may include a number of parameters, such as rules based on who is trying to contact one, what time of day, day of week, etc., and what one's preferred method of connection is. During off hours, one can direct communications to a phone answering machine or go into voicemail. With voicemail and full interactive voicemail, for example, one can provide code words for different users.

For example, users connecting to the service provider without a password would be presented with a schedule of dates and times of business. Users connecting with a password the service provider can have different passwords for different people. If the service provider wants to remove certain people from his password list, he can remove people individually, which would not be possible with a global password. This is simple to implement, but it is a service that nobody is currently providing.

The service provider could provide the user with the ability to use credit or debit cards or provide services on a pre-paid basis. Micropayment technology can also be used. The service may be wholly or partially advertiser supported. In one embodiment, billing is entrusted to the Intenet Service Providers (ISPs). Advertising may therefore accompany the telephone call, either visually (static or multimedia) or audibly through a browser, or auditorily during voice communications. A combination of streaming audio ads and springing (popup) ads may be presented to the user as he sets up the connection or during the connection, at least on one side.

The service provider can open up another window so that whatever website the user is viewing can stay open, and the service provider can open up a window that it knows its server controls during the connection process. The service provider can inform people of the status of the connection trying contact them and the service provider can put an ad in the same window. Or, the service provider can give the person who is subscribing to the service the option to provide their own advertising. They can pay the service provider on a use basis, but the subscriber can provide certain advertising files to be shown to people while they are waiting to be connected or while they are connected.

Since VOIP calling is essentially no cost, the facilitation of its use basically provides a way for people to have their own toll free number without an owning 800 number. Even if the subscriber had to pay to reserve bandwidth on an IP network, his costs are going to be less than a penny a minute. Alternative means of contact through this conventional phone network may be provided at additional costs. It is also possible to bill right to a phone bill The service provider can bill a specific amount per month and bundle a certain amount of usage. It can be like a cellular plan, flat amount of money per month, up to so many minutes that can't be carried forward. If you go over your minute usage, the subscriber would be charged for additional minutes. It is not desirable to bill micropayments on credit cards or phone bills. It is better to reduce those transactions, but pre-paid accounts or flat fees are more desirable.

According to an outbound proactive calling embodiment of the invention, a preferred trigger for a call is a shopping cart 20 status. Just as a sales clerk assists customers at checkout in a brick-and-mortar store, so can an on-line sales associate assist a user in selecting and purchasing items of interest. The receipt of an incoming voice communication by a user may be automatic or permissive. In the permissive case, a dialog box is called up to request permission to conduct a voice communication with the user. In some instances, displaying a text chat window will be as effective, and therefore such a function is preferably supported by the present invention as one alternative communication means. In some instances, playing a sound file will be as effective, and therefore such a function is preferably supported by the present invention as one alternative communication means.

According to the invention, telephony hardware per se is not required, except in certain circumstances. The telephony hardware is necessary, for example, in a gateway application, where there is a need to convert between IP and circuit based voice, or where one wants to engage the IP participant into other conventional telephony functions, that are provided by services of the Dialogic boards or equivalent, like conferencing or recording, and if the communication is not pure IP, or one wants to use Dialogic board resources to analyze the progress of a call to bring that call into the gateway itself. It is noted that, for VOIP, a VOIP gateway is required to interface with the Dialogic boards.

Another advantage of the present invention is that, by allowing virtual call centers, it allows operators to become independent contractors and call centers to staff at lower levels, since excess calls may be transferred outside a facility and handled by overflow or freelance operators of appropriate training and experience.

Another aspect of the present invention provides a remote control applet, allowing a remote operator to control (to co-control) the screen interface of a user's computer. This applet could also record actions and/or block functions, for example not allowing the agent to "click", e.g., blocking the MouseDown event, or tagging certain page elements as being local-execute only. Alternately, all actions could require a client-side confirm.

Many aspects of the present invention employ known techniques, although employed in different contexts herein. Therefore, it is understood that these known techniques and those associated with them may be employed in conjunction with the present invention, to the extent consistent therewith.

It is also understood that the various aspects of the invention may be employed together, individually or in subcombination. Further, it is understood that the present techniques are not limited to use on the Internet, as presently known, and may be applied to a large number of human computer interface systems.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended

What is claimed is:

1. An Internet telephony system for providing communications involving a user communicating through an Internet browser, comprising a server hosting a Web site providing a user interface to permit a user to select and purchase items of interest, said server executing an application program communicating with telephony hardware to implement telephony system control, said application program having an application programming interface, said application program interface functions comprising at least one call to an external program, wherein said server proactively transmits a message to the Internet browser based on an automated analysis of a status of a user's Internet shopping cart, representing items of interest having an unconcluded transaction status, requesting establishment of an interactive voice communication session, and wherein the user can allow initiation of the interactive voice communication session through the Internet browser, in accordance with a predefined set of user preferences defining a user's preferred communications mode, selected from the group consisting of voice over a data packet switched network and a public switched telephone network, and wherein the user's selected items of interest in the shopping cart are independent of the establishment of the interactive voice communication session.

2. The telephony system according to claim 1, wherein the user preferences are retrieved in a cookie.

3. The telephony system according to claim 1, wherein the user interactively communicates with the Web site to establish the status, the request for establishment of an interactive voice communication session being responsive to an economic interest of a party distinct from the user.

4. The telephony system according to claim 1, wherein the Internet browser presents a hyperlink to the user, a selection of said hyperlink causing the Internet browser to communicate with the server, retrieve user-related data, and open a voice over Internet protocol communication between the user and a second party.

5. The telephony system according to claim 1, wherein the user is charged for the communication.

6. The telephony system according to claim 5, wherein the user is charged a micropayment.

7. The telephony system according to claim 1, wherein the set of user preferences is retrieved in a cookie from the browser.

8. The telephony system according to claim 1, wherein the initiation of the interactive voice communication is dependent on at least an economic interest of a party distinct from the user.

9. The telephony system according to claim 1, wherein the external program comprises a dynamic link library adapted to run under Microsoft Windows operating system.

10. The telephony system according to claim 1, wherein the application program may spawn a plurality of instances of the external program simultaneously.

11. The telephony system according to claim 1, wherein the application program has a first component running on a telephony server and a second component running on each telephony client.

12. The telephony system according to claim 1, further comprising a communications link to the Web server, for coordinating telephony functions and Web server functions.

13. The telephony system according to claim 1, wherein the application program interfaces with a monetary accounting system.

14. The telephony system according to claim 1, wherein the application program interfaces with a micropayment accounting system.

15. The telephony system according to claim 1, wherein the application program supports an application service provider payment model.

16. The telephony system according to claim 1, wherein the user, in order to communicate with the server to request the voice communication, need only initiate a generic action which is interpreted by the server in accordance with the status and the set of user preferences to initiate an appropriate response.

17. The telephony system according to claim 1, supporting simultaneous voice and data communications with the user, for receiving the request to establish the voice communication with the user over a digital data communications channel and in response to the received request, establishing the user voice communication in dependence the set of user preferences, wherein the voice over packet data network communicates through the data communications channel and the public switched telephone network communicates over a communications channel distinct from the data communications channel.

18. The telephony system according to claim 17, wherein said digital data communications channel carries data between the Internet browser and the server, the server communicating with a distinct server for establishing the user voice communication channel involving the public switched telephone network.

19. The telephony system according to claim 1, wherein the user interactively communicates through the data packet switched network to establish the status, said server being further responsive to an economic interest of a party distinct from the user.

20. A telephony method for providing communications involving a user communicating through an Internet browser, comprising:
   providing a user interface of a Web site hosted on a server, permitting the user to select and purchase items of interest;
   executing an application program communicating with telephony hardware to implement telephony system control, the application program having an application programming interface, the application program interface functions comprising at least one call to an external program;
   proactively transmitting a message to the Internet browser based on an automated analysis of a status of the user's Internet shopping cart, representing items of interest having an unconcluded transaction status, requesting establishment of an interactive voice communication session; and initiating the interactive voice communication session through the Internet browser by the user, in accordance with a predefined set of user preferences defining the user's preferred communications mode, selected from the group consisting of voice over a data packet switched network and a public switched telephone network, and wherein the user's selected items of interest in the shopping cart are independent of the establishment of the interactive voice communication session.

21. The telephony method according to claim 20, wherein the user preferences are retrieved in a cookie.

22. The telephony method according to claim 20, wherein the user interactively communicates with the Web site to establish the status, the request for establishment of an interactive voice communication session being responsive to an economic interest of a party distinct from the user.

23. The telephony method according to claim 20, wherein the Internet browser presents a hyperlink to the user, a selection of said hyperlink causing the Internet browser to communicate with the server, retrieve user-related data, and open a voice over Internet protocol communication between the user and a second party.

24. The telephony method according to claim 20, wherein the user is charged for the communication.

25. The telephony method according to claim 20, wherein the initiation of the interactive voice communication is dependent on at least an economic interest of a party distinct from the user.

26. The telephony method according to claim 20, wherein the external program comprises a dynamic link library adapted to run under Microsoft Windows operating system.

27. The telephony method according to claim 20, wherein the application program may spawn a plurality of instances of the external program simultaneously.

28. The telephony method according to claim 20, further comprising supporting simultaneous voice and data communications with the user, receiving the request to establish the voice communication with the user over a digital data communications channel, and in response to the received request, establishing the user voice communication in dependence the set of user preferences, wherein the voice over packet data network communicates through the data communications channel and the public switched telephone network communicates over a communications channel distinct from the data communications channel.

* * * * *